(12) United States Patent
Hou

(10) Patent No.: US 8,397,752 B2
(45) Date of Patent: Mar. 19, 2013

(54) PROCESS FOR FABRICATING INTEGRAL PLASTIC FAUCET MEMBER AND FINISHED PRODUCT THEREOF

(75) Inventor: Hsine-Chang Hou, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 841 days.

(21) Appl. No.: 12/255,794

(22) Filed: Oct. 22, 2008

(65) Prior Publication Data
US 2010/0096034 A1    Apr. 22, 2010

(51) Int. Cl.
*E03B 1/00* (2006.01)
*F16K 11/22* (2006.01)
*F16K 5/00* (2006.01)
*F16K 27/00* (2006.01)
*F16K 43/00* (2006.01)
*F16K 51/00* (2006.01)
*F16L 55/18* (2006.01)
*B28B 5/00* (2006.01)
*B28B 7/22* (2006.01)

(52) U.S. Cl. .................. 137/606; 137/315.12; 264/250; 264/255

(58) Field of Classification Search .................. 137/606, 137/15.17, 315.12; 264/250, 255, 262, 328.16, 264/271.1, 279.1, 275, 274
See application file for complete search history.

(56) References Cited

U.S. PATENT DOCUMENTS

| | | | | |
|---|---|---|---|---|
| 2,200,091 | A | * | 5/1940 | Kovach ........................... 251/86 |
| 3,520,325 | A | * | 7/1970 | Stuart ............................ 137/375 |
| 3,998,240 | A | * | 12/1976 | Liautaud ....................... 137/375 |
| 4,075,273 | A | * | 2/1978 | Liautaud ....................... 264/250 |
| 5,447,341 | A | * | 9/1995 | Hartel et al. .................. 285/238 |
| 5,895,695 | A | * | 4/1999 | Rowley ........................ 428/36.9 |
| 2005/0051563 | A1 | * | 3/2005 | Yamada ........................ 220/694 |

\* cited by examiner

*Primary Examiner* — Len Tran
*Assistant Examiner* — Chee-Chong Lee

(57) ABSTRACT

A process for fabricating an integral plastic faucet member and a finished product thereof are provided. The process mainly includes two injection steps. A first plastic injection is used to mold a first part at a middle connecting part of a faucet member. The first part is then placed into a mold for a second plastic injection so as to mold a second part at two sides of the faucet member. The second part is properly wrapped around and bonded to the first part. Meanwhile, desired holes are reserved to serve as water inlets, water outlets, and valve seats. Through such a two-injection process, the conventional complicated and time-consuming copper casting process is simplified, which improves the production efficiency and product quality, lows the cost and defective ratio. Meanwhile, the product weight is also reduced, which greatly reduces the transportation cost.

1 Claim, 7 Drawing Sheets

PROCESS FOR FABRICATING INTEGRAL PLASTIC FAUCET MEMBER AND FINISHED PRODUCT THEREOF

BACKGROUND OF THE INVENTION

1. Field of Invention

The present invention relates to a faucet member, and more particularly to a process for fabricating an integral plastic faucet member and a finished product thereof.

2. Related Art

A conventional faucet component generally includes a faucet member, especially a faucet member with two water inlets. Such a faucet member is approximately H-shaped and has a left valve seat part, a right valve seat part, a connecting part between the valve seat parts, and support leg parts extending from bottom ends of the valve seat parts. The bottom end of each valve seat part has a water inlet. The water inlets may be respectively in communication with the valve seat parts above via an internal flow passage. A valve body may be mounted on each valve seat part and each of the valve bodies may be controlled by rotating a corresponding handle. In addition, the connecting part between the valve seat parts has an internal flow passage. Generally, at least one water outlet is disposed on the internal flow passage. The water outlet may be connected to various water-outlet members such as a water-outlet pipe of a tap and a showerhead. Here, the tap may be directly mounted and secured on a wash sink through external threads on the two support leg parts of the faucet member and threaded fasteners, and then the tap is covered by a suitable external housing. In use, by properly switching the handles to actuate the corresponding valve bodies, water sources such as cold and hot water from the water inlets can be controlled to flow to the water outlet at the connecting part via the valve bodies, pass through the water outlet or various water-outlet members connected thereto, and then flow or be sprayed out in a predetermined water-outlet pattern.

It should be particularly noted that about two methods are used for fabricating the above faucet member currently. The first method is to directly use a copper casting process, which includes the following steps. A sand core and a sand mold are fabricated. An approximate prototype is finished by casting molten copper and removing the sand core. Afterward, subsequent machining processes such as threading, drilling, and milling are performed to obtain the desired faucet member. Therefore, the whole process is complicated and time-consuming, resulting in an excessively long processing time, a low efficiency, and a low product yield. In addition, the fast wearing of cutting tools required by machining also increase the production and fabrication costs. Meanwhile, if the cutting tools are not properly maintained or replaced, the precision of finished size may also be affected, resulting in degradation of the product quality. Moreover, the copper used in copper casting is expensive, and also has a high specific weight, which correspondingly increases the whole transportation cost. Thus, such a process is not cost effective.

In the second method, two side members formed by valve seat parts and support leg parts on two sides of the faucet member as well as a hollow strip-shaped member at the middle connecting part are respectively fabricated by plastic injection molding. Then, two ends of the hollow strip-shaped member are respectively adhered to corresponding positions reserved on the side members by a binder, so as to form the faucet member. Such a process can overcome the mold-release problem that cannot be solved in molding a flow passage of the middle connecting part in the integral plastic injection. However, such a process has its own disadvantages. After the members are injection molded, they must be adhered manually, so that the labor cost of assembly is high and the production efficiency is limited and cannot be improved. Meanwhile, for the manual assembly operation, the assembly quality cannot be effectively guaranteed, since the craft and skill level vary with different operators. In addition, since the members are adhered to each other with the binder, the bonding strength is low. Furthermore, since properties of the binder are prone to change, the adhered parts cannot be combined tightly, which may also affect the quality and service life of the product. Therefore, the conventional methods for fabricating the faucet member have many defects, and need further improvement and innovation.

SUMMARY OF THE INVENTION

Accordingly, the present invention is directed to a process for fabricating an integral plastic faucet member and a finished product thereof. The process mainly includes two injection steps. A first plastic injection is used to mold a first part at a middle connecting part of a faucet member. The first part is then taken out and positioned in a prearranged mold for a second plastic injection so as to mold a second part at two sides of the faucet member. The second part may be properly integrally wrapped around and bonded to the first part in the second plastic injection molding. Meanwhile, desired holes are reserved on the first part and the second part to serve as water inlets, water outlets, and valve seats. Thus, a desired faucet member is fabricated.

The process provided in the present invention only needs two plastic injection molding steps and a step of taking out and positioning the molded first part, so the whole process is quite simple. Therefore, the production efficiency and product quality can be greatly improved. Meanwhile, the weight of the product is also low, which greatly reduces the transportation cost. Since the second part may be wrapped around the first part and integrally molded with the first part, a better structural strength is achieved. Moreover, since the assembly does not need too many labor forces, the production efficiency and product quality is also be improved, and the labor cost of assembly is reduced.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
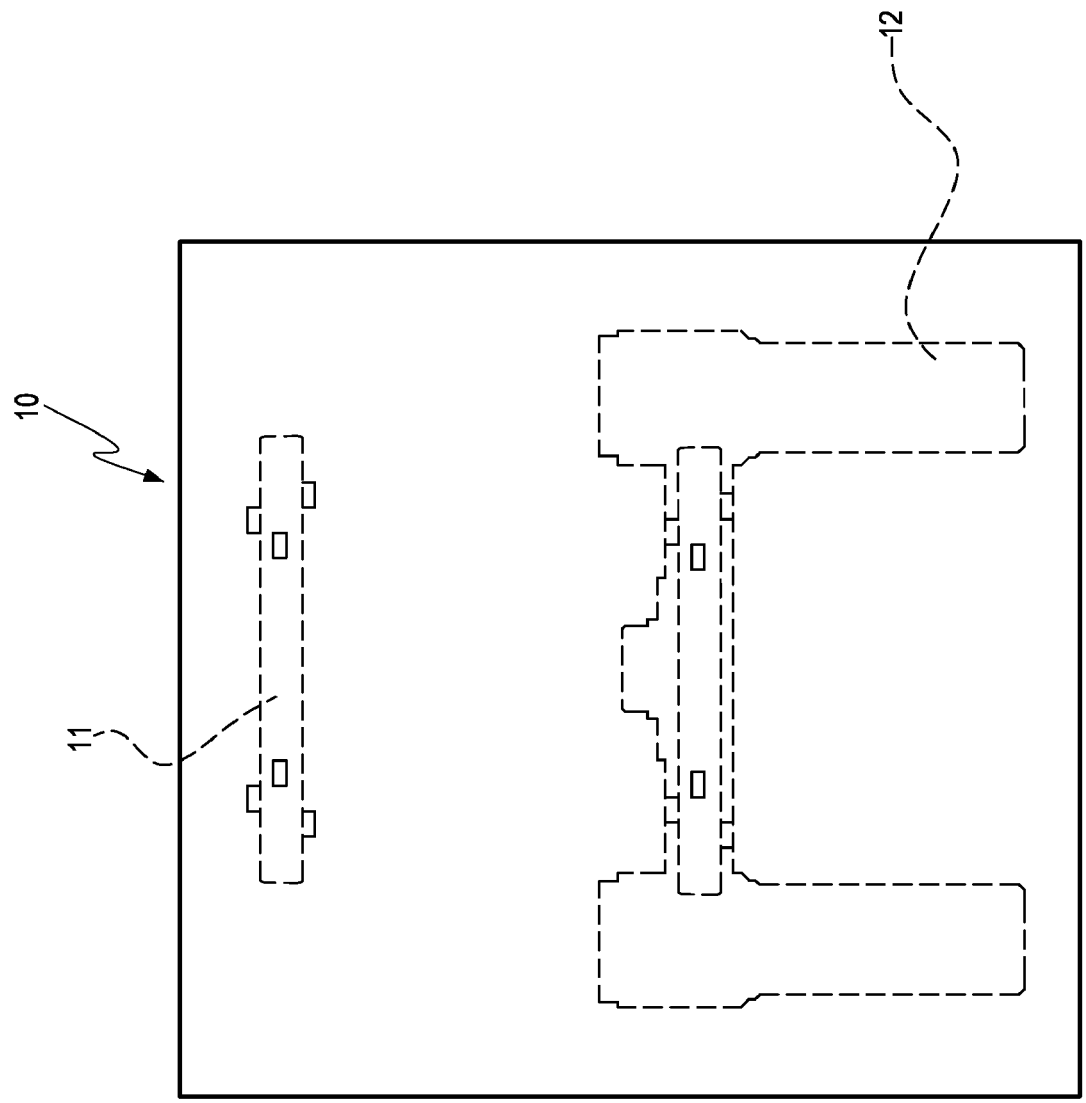
FIG. 1 is a schematic view of a mold of a process for fabricating an integral plastic faucet member according to a preferred embodiment of the present invention, which includes a first mold cavity and a second mold cavity.
Figure 2:
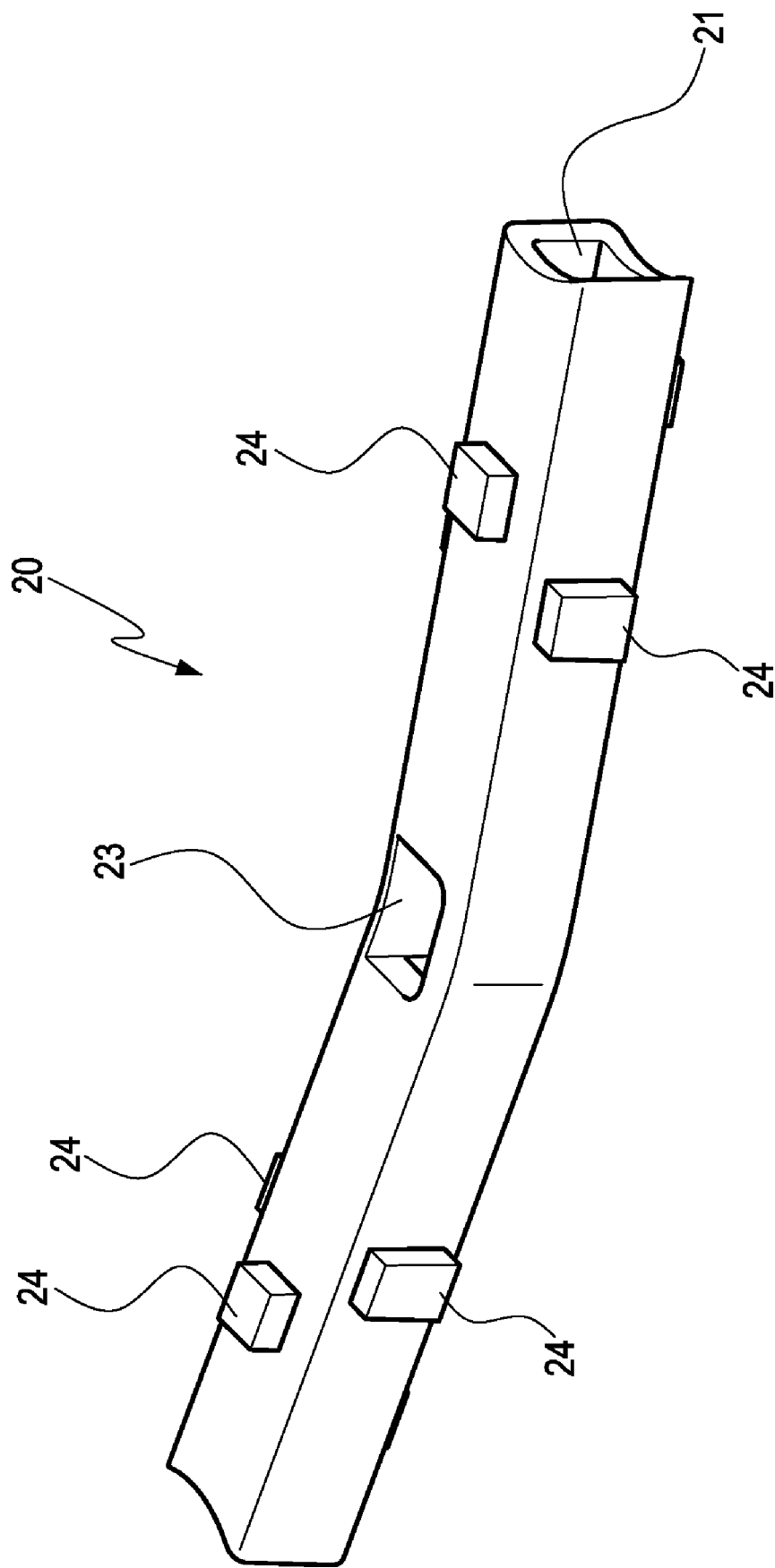
FIG. 2 is a three-dimensional view of the appearance of a first part according to a preferred embodiment of the present invention.
Figure 3:
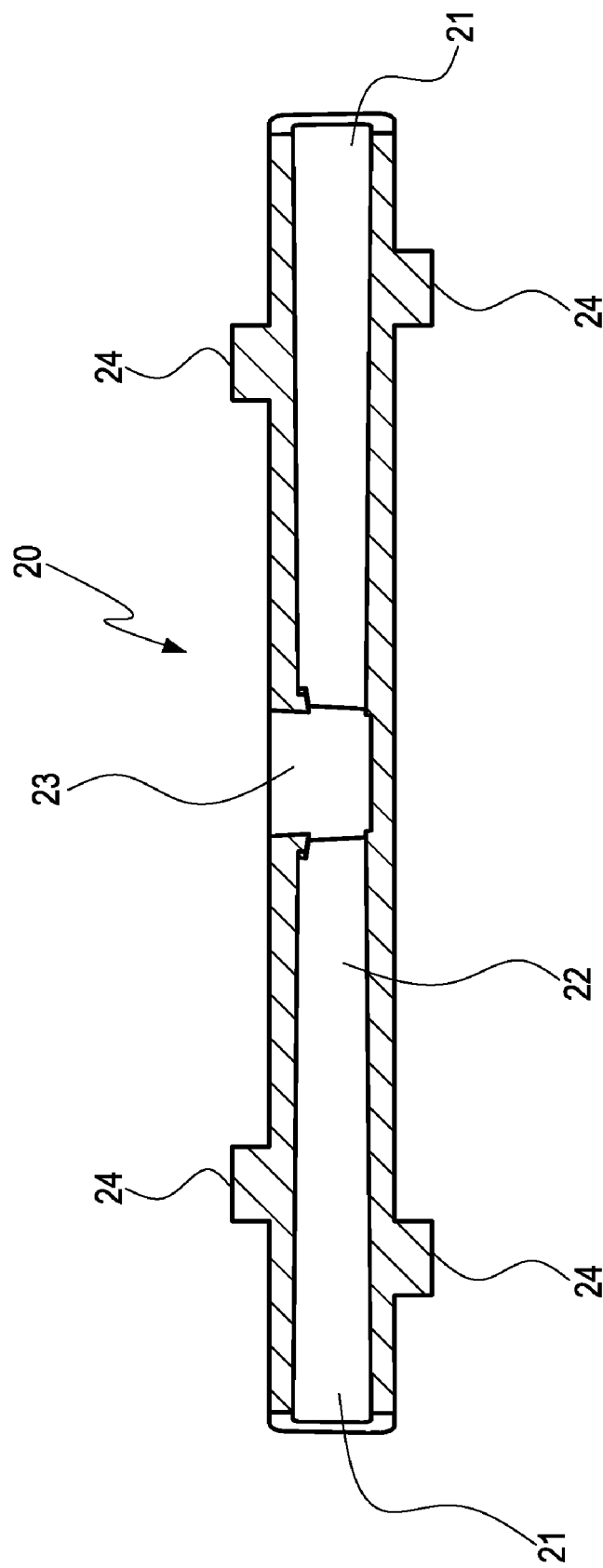
FIG. 3 is a cross-sectional side view of the first part according to a preferred embodiment of the present invention.
Figure 4:
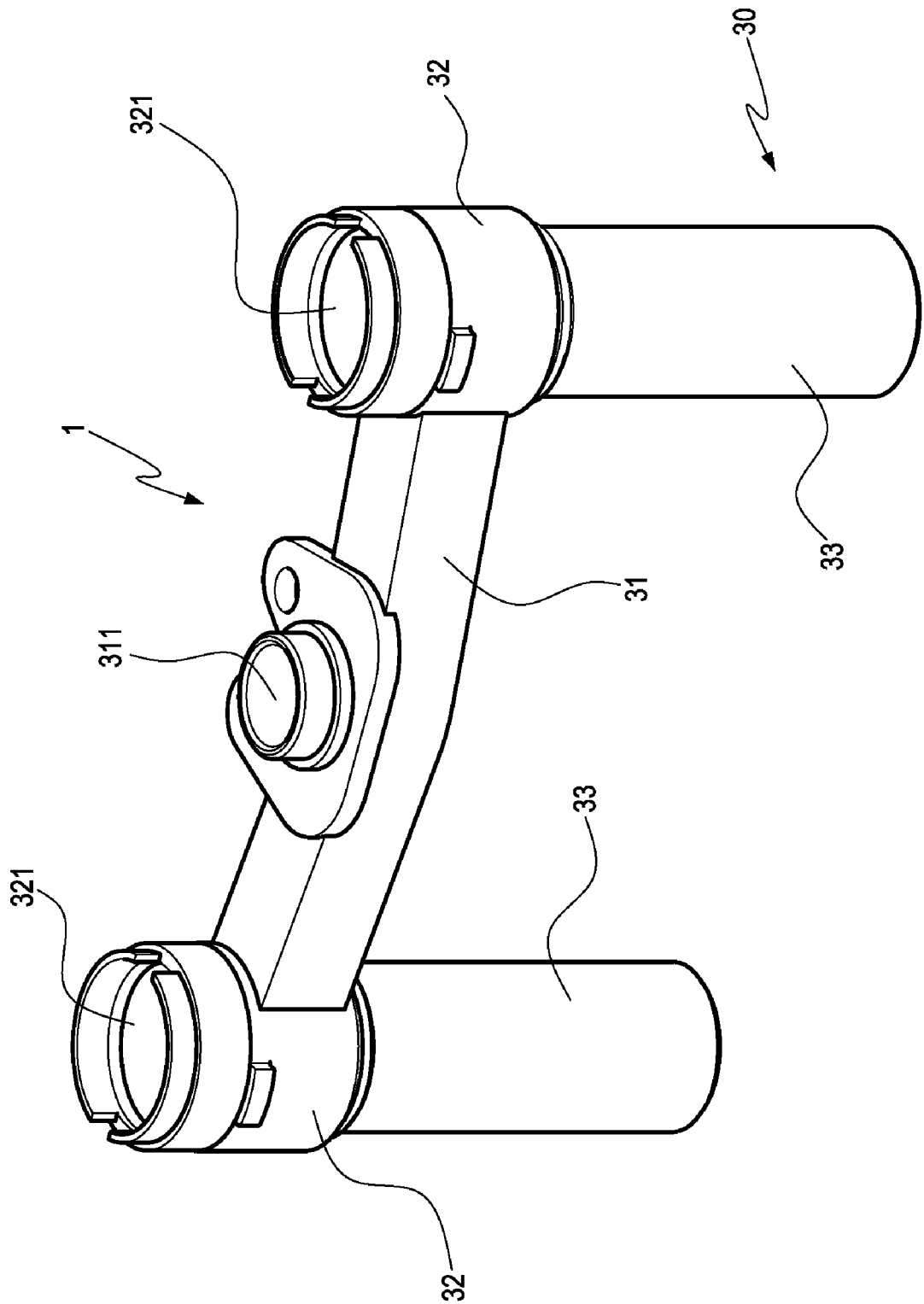
FIG. 4 is a three-dimensional view of the appearance of an integral plastic faucet member according to a preferred embodiment of the present invention, which includes a second part wrapped around an outer surface of the first part through integral injection.
Figure 5:
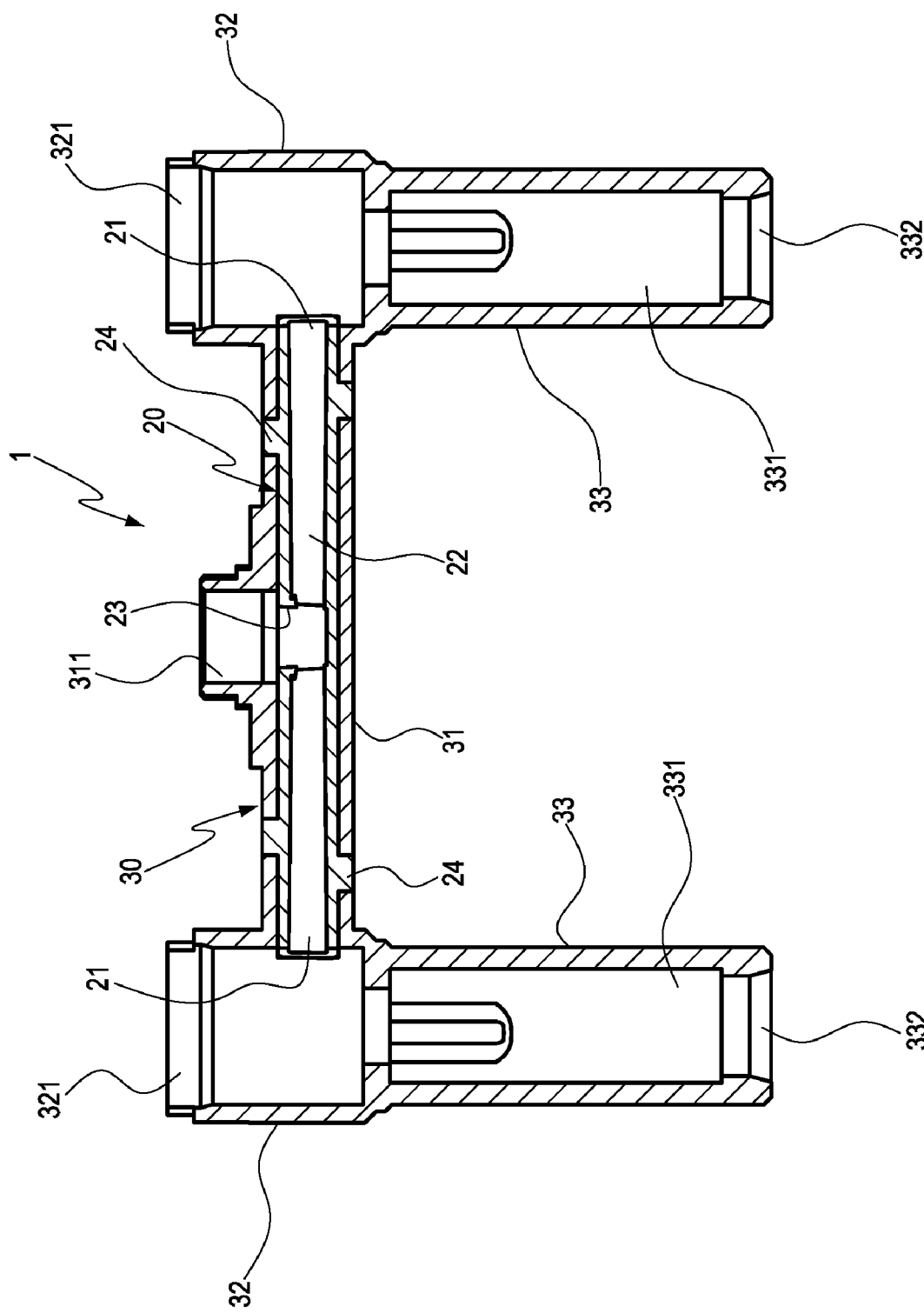
FIG. 5 is a cross-sectional side view of the integral plastic faucet member according to a preferred embodiment of the present invention, which includes a second part wrapped around the outer surface of the first part through integral injection.

First, referring to FIG. 1, a process for fabricating an integral plastic faucet member according to a preferred embodiment of the present invention mainly includes the following steps:

a. First Plastic Injection Molding Step:

A hollow strip-shaped first part 20 is integrally molded by using a prearranged mold 10. As shown in FIGS. 2 and 3, the mold 10 of this embodiment includes a first mold cavity 11 and a second mold cavity 12. The first part 20 may be molded by using the first mold cavity 11. Each of two ends of the first part 20 has an inner water inlet 21. A flow passage 22 is communicated between the inner water inlets 21. In this embodiment, the flow passage 22 has an inner water outlet 23 in communication therewith above a middle portion thereof.

b. The Step of Taking Out and Positioning the First Part:

In this embodiment, the first part 20 molded in the first mold cavity 11 of the mold 10 is clamped and taken out, and then placed and positioned in the second mold cavity 12 of the mold 10 by a manipulator (not shown), as shown in FIG. 1.

c. Second Plastic Injection Molding Step:

In this embodiment, the second plastic injection molding is mainly performed in the second mold cavity 12, such that a second part 30 is integrally wrapped around the first part 20 positioned in the second cavity, as shown in FIGS. 4 and 5. The second part 30 includes a wrapping part 31, two valve seat parts 32, and two support leg parts 33. The wrapping part 31 is integrally wrapped around an outer surface of the first part 20, and has an outer water outlet 311 in communication with the inner water outlet 23 of the first part 20. The valve seat parts 32 are integrally connected to left and right end sides of the wrapping part 31. Each valve seat part 32 is formed with a mounting groove 321. A water flow control valve body (not shown in the figures) is mounted in each of the mounting grooves 321. The mounting grooves 321 are respectively in communication with the inner water inlets 21 at the two ends of the first part 20. The support leg parts 33 respectively integrally extend from bottom ends of the valve seat parts 32. Each support leg part 33 has a flow passage 331 therein. The flow passages 331 are respectively in communication with the mounting grooves 321 of the corresponding valve seat parts 32. An outer water inlet 332 is formed on each flow passage 331 at the bottom end of each support leg part 33. Thus, the second part 30 can be properly integrally wrapped around and bonded to the first part 20, thereby fabricating a finished product of an integral plastic faucet member 1.

In the above preferred embodiment of the present invention, since the first plastic injection molding and the second plastic injection molding can be performed in the first mold cavity 11 and the second mold cavity 12 of the same mold 10 respectively, it is unnecessary to use two molds, and the material and fabrication costs of the mold are saved. Meanwhile, since the first part 20 can be taken out, placed, and positioned by the manipulator, a fast and automated mass production is achieved. It should be understood that, actual production and fabrication are not limited to the above operation mode that uses the same mold 10 and the manipulator; instead, persons skilled in the art can select and use operation modes according to their own requirements.

In other words, two molds (not shown) may also be used, in which a first mold (not shown) is used for fabricating the first part and a second mold is used for positioning the first part and subsequently injection molding the second part. Meanwhile, the first part may be taken out and positioned manually. Thus, an finished product of the integral plastic faucet member can also be easily fabricated.

For the process of the above preferred embodiment of the present invention, in actual applications, the plastic injection molding in the first mold cavity 11 and the second mold cavity 12 can be performed at the same time. It should be particularly noted that, in the first injection molding, though injection molding can be performed in the first mold cavity 11 and the second mold cavity 12 at a same time, as no finished first part 20 can be placed and positioned in the second mold cavity 12, only a first part 20 can be molded in the first mold cavity 11, and no finished product of the integral plastic faucet member 1 can be molded in the second mold cavity 12. This is because that no first part 20 is placed in the second mold cavity 12, and the real first integral plastic faucet member 1 cannot be fabricated until the first one of the first part 20 is placed and positioned in the second mold cavity 12 and the second plastic injection molding is performed. Therefore, an abnormal second part 30 is produced at the beginning of the process. It should be understood that, when the second plastic injection molding is performed, the second one of the first part 20 is also molded, which is used to fabricate the second integral plastic faucet member 1 in a third plastic injection molding. Similarly, in the last process, an extra first part 20 is also molded in the first mold cavity 11. Therefore, in the whole automated production process, though one abnormal second part 30 and one first part 20 are wasted, the first plastic injection molding and the second plastic injection molding can be synchronously performed in the first mold cavity 11 and the second mold cavity 12 of the same mold 10 at the same time. Thus, the fabricating time of each plastic faucet member 1 is greatly shortened, so that the production efficiency is greatly improved, which is another innovation of the present invention.

For the process of the above preferred embodiment of the present invention, a plurality of positioning blocks 24 may be further molded on an outer peripheral wall of the first part 20, as shown in FIG. 2, such that the first part 20 may be firmly mounted and positioned in the second mold cavity 12 of the mold 10. As such, when the mold 10 is closed and a plastic material is injected, the first part 20 will not be dislocated due to the flowing pressure of the injected plastic material, thus guaranteeing the stable proceeding and molding quality of the second plastic injection molding.

For the process of the above preferred embodiment of the present invention, in order to guarantee the structural strength of the plastic faucet member 1 and the wrapping and bonding strength between the first part 20 and the second part 30, both the first part 20 and the second part 30 can use glass fiber mixed with nylon as a plastic molding material.

Referring to FIGS. 2 to 5, a finished product of the integral plastic faucet member 1 fabricated with the process of the above preferred embodiment of the present invention mainly includes a first part 20 and a second part 30.

The first part 20 is integrally injection molded from a plastic material, and is hollow and strip-shaped. Each of two ends of the first part 20 has an inner water inlet 21. A flow passage 22 is communicated between the inner water inlets 21. In this embodiment, the flow passage 22 has an inner water outlet 23 in communication therewith above a middle portion thereof.

The second part 30 is wrapped around the outer surface of the first part 20 through integral injection, and includes a wrapping part 31, two valve seat parts 32, and two support leg parts 33. The wrapping part 31 is integrally wrapped around the outer surface of the first part 20, and has an outer water outlet 311 in communication with the inner water outlet 23 of the first part 20. The valve seat parts 32 are integrally connected to left and right end sides of the wrapping part 31. Each valve seat part 32 is formed with a mounting groove 321. The mounting grooves 321 are respectively in communication with the inner water inlets 21 at the two ends of the first part 20. The support leg parts 33 respectively integrally extend from bottom ends of the valve seat parts 32. Each support leg part 33 has a flow passage 331 therein. The flow passages 331 are respectively in communication with the mounting grooves 321 of the corresponding valve seat parts 32. An outer water inlet 332 is formed on each flow passage 331 at the bottom end of each support leg part 331.

Figure 6:
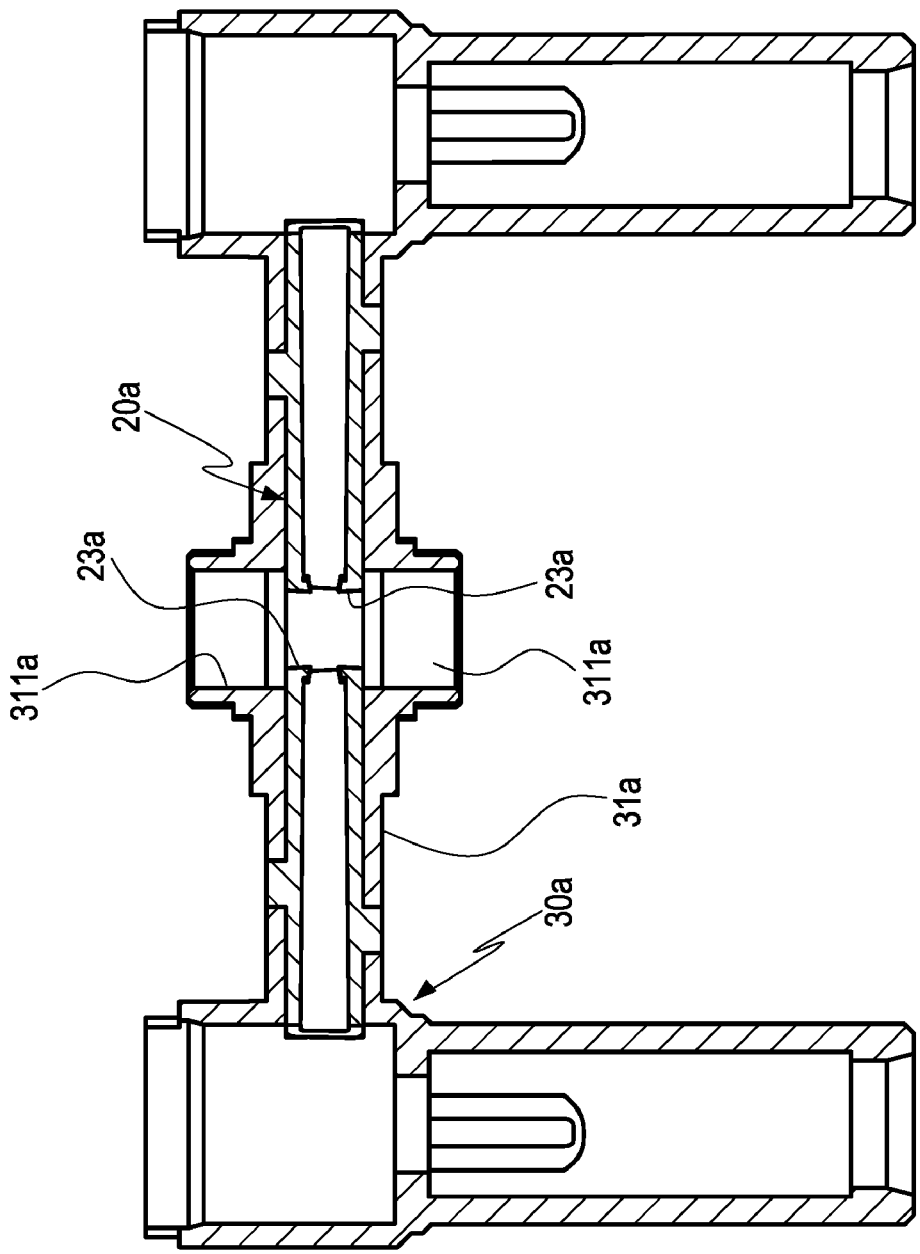
FIG. 6 is a cross-sectional side view of an integral plastic faucet member according to a second embodiment of the present invention, which respectively includes two inner water outlets and two outer water outlets on the first part and the second part.

FIG. 6 is a cross-sectional view of a second embodiment of the present invention. Referring to FIG. 6, in the finished product of the integral plastic faucet member fabricated in the above preferred embodiment of the present invention, besides that the first part may be molded with an inner water outlet in communication therewith above the middle part of the flow passage, the inner water outlet may also be molded below the middle part, two inner water outlets may be respectively molded above and below the middle part, such that the outer water outlet of the second part is formed at a position relative to the inner water outlet according to different water outlet requirements. Referring to FIG. 6, two inner water outlets 23*a* are molded above and below a middle part of a first part 20*a* respectively, and two corresponding outer water outlets 311*a* in communication with each other are molded at upper and lower sides of a wrapping part 31*a* of a second part 30*a*. After the finished product is fabricated, the lower outer water outlet 311*a* can be connected to a connecting pipe and then connected to a nozzle from a free end of the connecting pipe.

Figure 7:
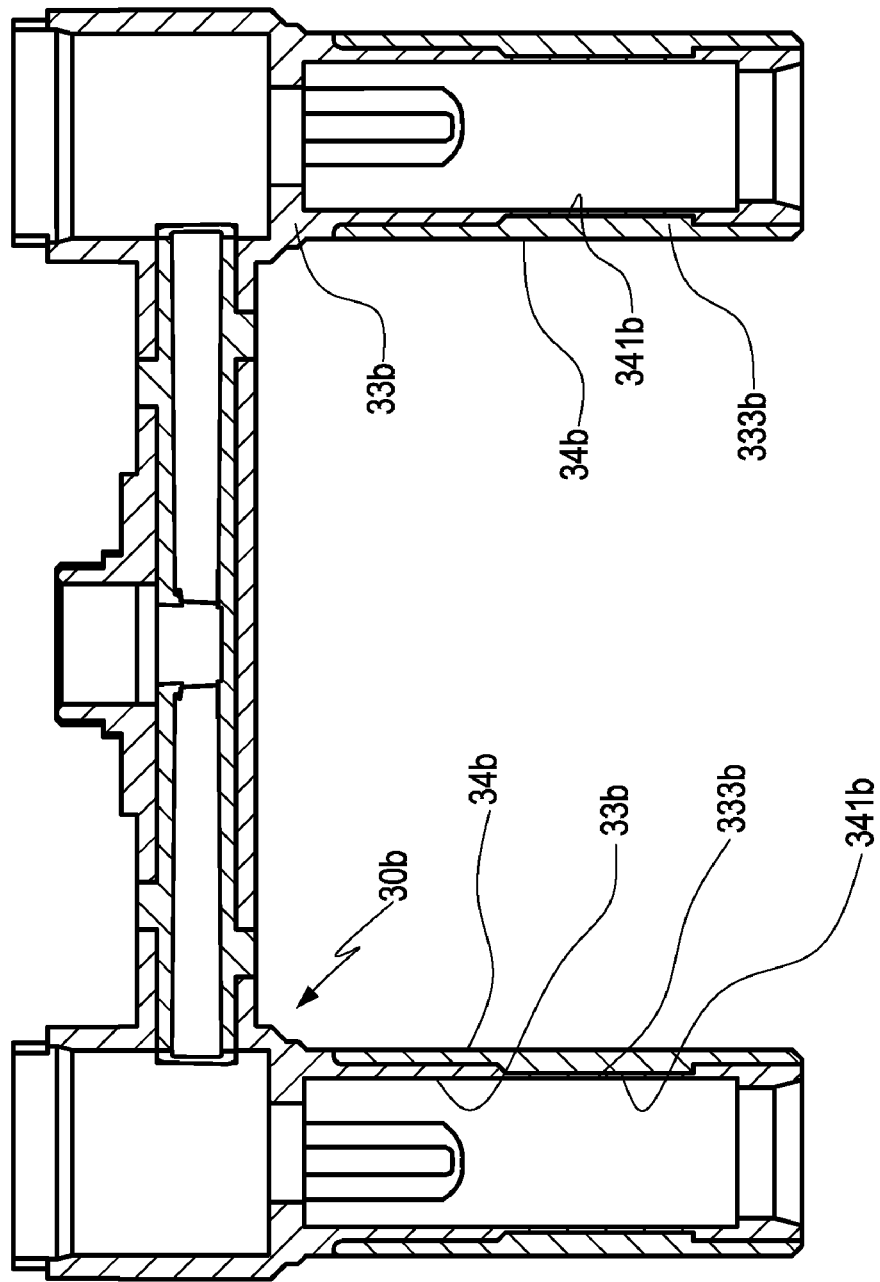
FIG. 7 is a cross-sectional side view of an integral plastic faucet member according to a third embodiment of the present invention, which includes copper threaded members on support leg parts of the second part.

In the second plastic injection molding f the process of the present invention, outer peripheral walls of the support leg parts may be directly molded with external threads for thread engagement (not shown). Similarly, inner peripheral walls or outer peripheral walls of the valve seat parts may also be directly injection molded with internal threads or external threads for thread engagement (not shown). FIG. 7 is a cross-sectional view of a third embodiment of the present invention. Referring to FIG. 7, each support leg part 33*b* of a second part may be formed with an annular groove 333*b* on an outer peripheral wall thereof in plastic injection, and then, a copper member 34*b* with preformed external threads (not shown) on an outer peripheral wall thereof is engaged with and fixed to the annular groove 333*b* on each support leg part 33*b* through annular protrusions 341*b* protruding from an inner peripheral wall thereof, such that the outer peripheral wall of each support leg part 33*b* of the second part 30*b* has a copper structure with external threads for thread fastening. Therefore, in the present invention, the support leg parts formed with external threads on the outer peripheral walls thereof can be formed by adding a step of preforming and engaging the copper members 34*b* in the second plastic injection molding.

In the process for fabricating an integral plastic faucet member according to the above preferred embodiment of the present invention, the second part 30 including the wrapping part 31, the valve seat parts 32, and the support leg parts 33 is integrally wrapped around the first part 20 in the second plastic injection molding. However, the second part 30 may be molded without the support leg parts 33 at first, that is, with only the wrapping part 31 and the valve seat parts 32. After that, copper members preformed as support leg parts are mounted at the bottom ends of the valve seat parts 32. Therefore, in the present invention, the support leg parts formed by copper members can be achieved by adding a step of preforming and mounting copper support leg parts after the second plastic injection molding.

In view of the above, the process for fabricating an integral plastic faucet member and the finished product thereof in the present invention have the following features and efficacies:

1. In the present invention, each integral plastic faucet member 1 can be fabricated through only two plastic injection steps and a step for taking out and positioning the first part 20, so the process of the present invention is simplified as compared with the complicated and time-consuming molding and machining processes of the conventional copper casting method, and realizes fast mass fabrication. Moreover, the production efficiency and product yield can be greatly improved, and the production and fabrication costs can thus be greatly reduced.

2. The integral plastic faucet member 1 of the present invention is completely integrally made of a plastic material, which has a specific weight lower than that of copper used in the conventional copper casting method. Therefore, the integral plastic faucet member 1 of the present invention is light, which reduces the transportation cost substantially, and reduces the whole raw material cost.

3. Though the integral plastic faucet member 1 of the present invention is fabricated through two plastic injection molding steps, the first part 20 and the second part 30 on the finished product are integrally molded and bonded by wrapping, and no binder or manual adhering operation are needed in the process. Therefore, compared with conventional processes in which members molded through plastic injection must be further adhered, a far better structural strength is achieved, and uncertainty of product quality caused by the manual assembly operation is effectively eliminated, thus achieving a higher product quality, higher fabrication efficiency, and a longer service life.

4. The two injection steps used in the present invention can be performed in the first mold cavity 11 and the second mold cavity 12 of the same mold 10, and the first part 20 can be clamped, taken out, and positioned by using a manipulator, so that the whole process needs no manual operation. Therefore, a fast and automated mass production is achieved, and the production efficiency and product yield can surely be further improved.

To sum up, the present invention meets the inventiveness requirements among similar products. Furthermore, not only the specific constructions disclosed never appeared in the products of the same kind, but also have never been published at home and abroad before the instant application. Therefore, the present application meets the requirements of an invention patent, and thus the present application is filed for a patent according to the law.

The foregoing is merely intended to illustrate preferred embodiments of the present invention. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A finished product of an integral plastic faucet member consisting of:
   a first part, integrally injection molded from a plastic material and formed in a hollowly elongated tube shape, each of two ends of the first part having an inner water inlet, the inner water inlet having an opening defined in an axial direction thereof and parallel to a flowing passage, being communicated between two inner water inlets, and at least one inner water outlet in communication with the flow passage being disposed at a predetermined position of the flow passage; and
   a second part, being wrapped around the first part through integral injection of a plastic material and at least comprising a wrapping part and two valve seat parts, the wrapping part being integrally wrapped around an outer surface of the first part and having at least one outer water outlet substantively used as a connecting hole and communicating with the inner water outlet of the first part, the two valve seat parts being integrally connected to two end sides of the wrapping part, each valve seat part being formed with a mounting groove, and the mounting grooves being respectively in communication with the two inner water inlets at the two ends of the first part, and the two inner water inlets are located at inner walls of the mounting grooves of a connection of the wrapping part and the two valve parts; and
   two copper members;
   wherein the second part further comprises two support leg parts, the support leg parts respectively integrally extending from bottom ends of the valve seat parts, each support leg part having a flow passage therein, the flow passages being respectively in communication with the mounting grooves of the corresponding valve seat parts, and an outer water inlet being formed on each of the flow passages at the bottom end of each of the support leg parts;
   wherein the first part and the second part are integrally injection molded from a plastic material of glass fiber mixed with nylon;
   wherein the outer peripheral wall of each support leg part is engaged with and fixed to each of the two copper members, and two outer peripheral walls of the two copper members have external threads.

* * * * *

UNITED STATES PATENT AND TRADEMARK OFFICE
CERTIFICATE OF CORRECTION

| | | |
|---|---|---|
| PATENT NO. | : 8,397,752 B2 | Page 1 of 1 |
| APPLICATION NO. | : 12/255794 | |
| DATED | : March 19, 2013 | |
| INVENTOR(S) | : Hsine-Chang Hou | |

It is certified that error appears in the above-identified patent and that said Letters Patent is hereby corrected as shown below:

In the Claims

Column 8, line 6 (Claim 1, line 26)

the two valve parts should be the two valve seat parts

Signed and Sealed this
Twentieth Day of May, 2014

Michelle K. Lee
*Deputy Director of the United States Patent and Trademark Office*